Aug. 24, 1965
W. J. ZIMMERLE ETAL
3,202,851
METHOD AND MEANS FOR ALIGNING AND FASTENING LAMINATIONS
OF DYNAMOELECTRIC MACHINE
Filed July 19, 1961
4 Sheets-Sheet 2
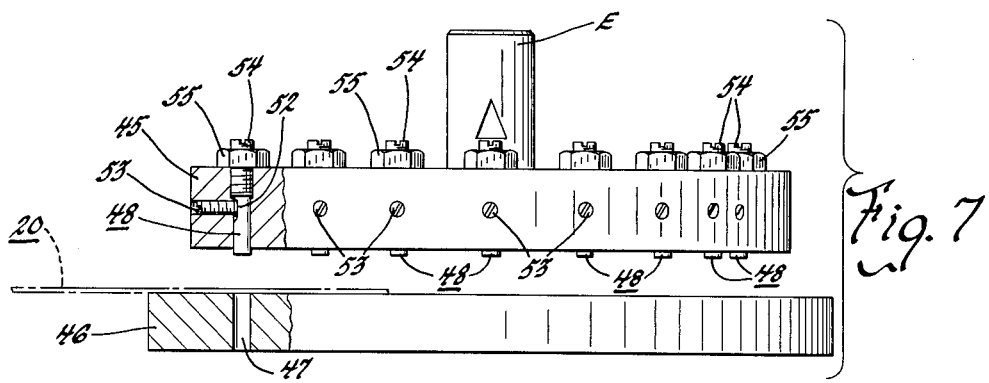
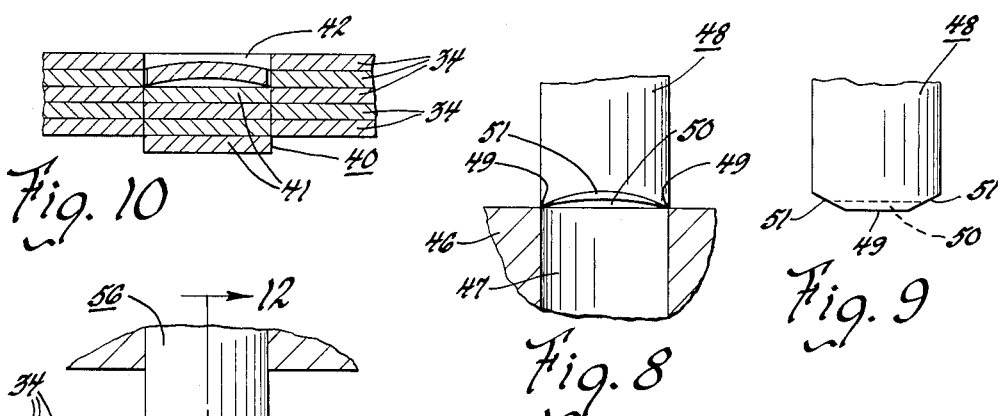
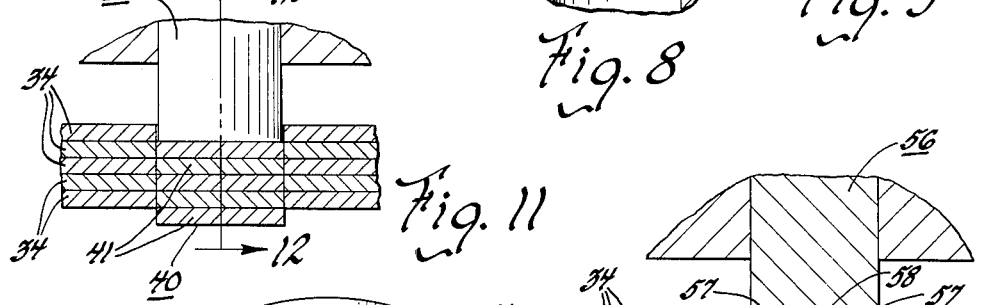
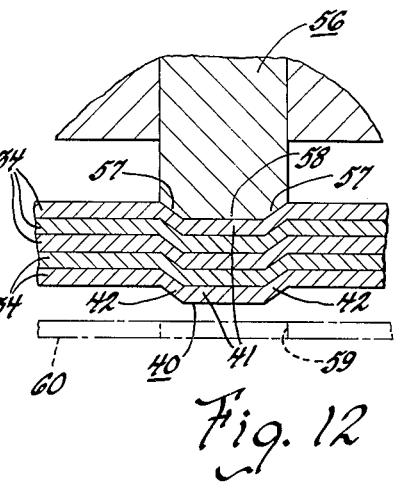
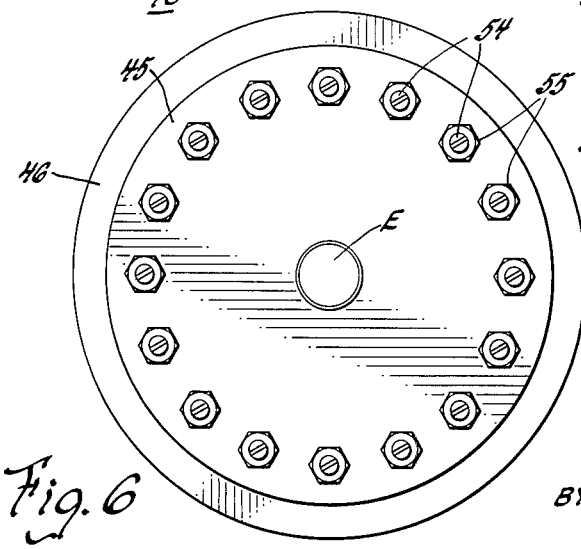
INVENTORS
Wilbur J. Zimmerle
Charles E. Stroebel
Robert O. Dehlendorf
BY Albert H. Reuther
THEIR ATTORNEY

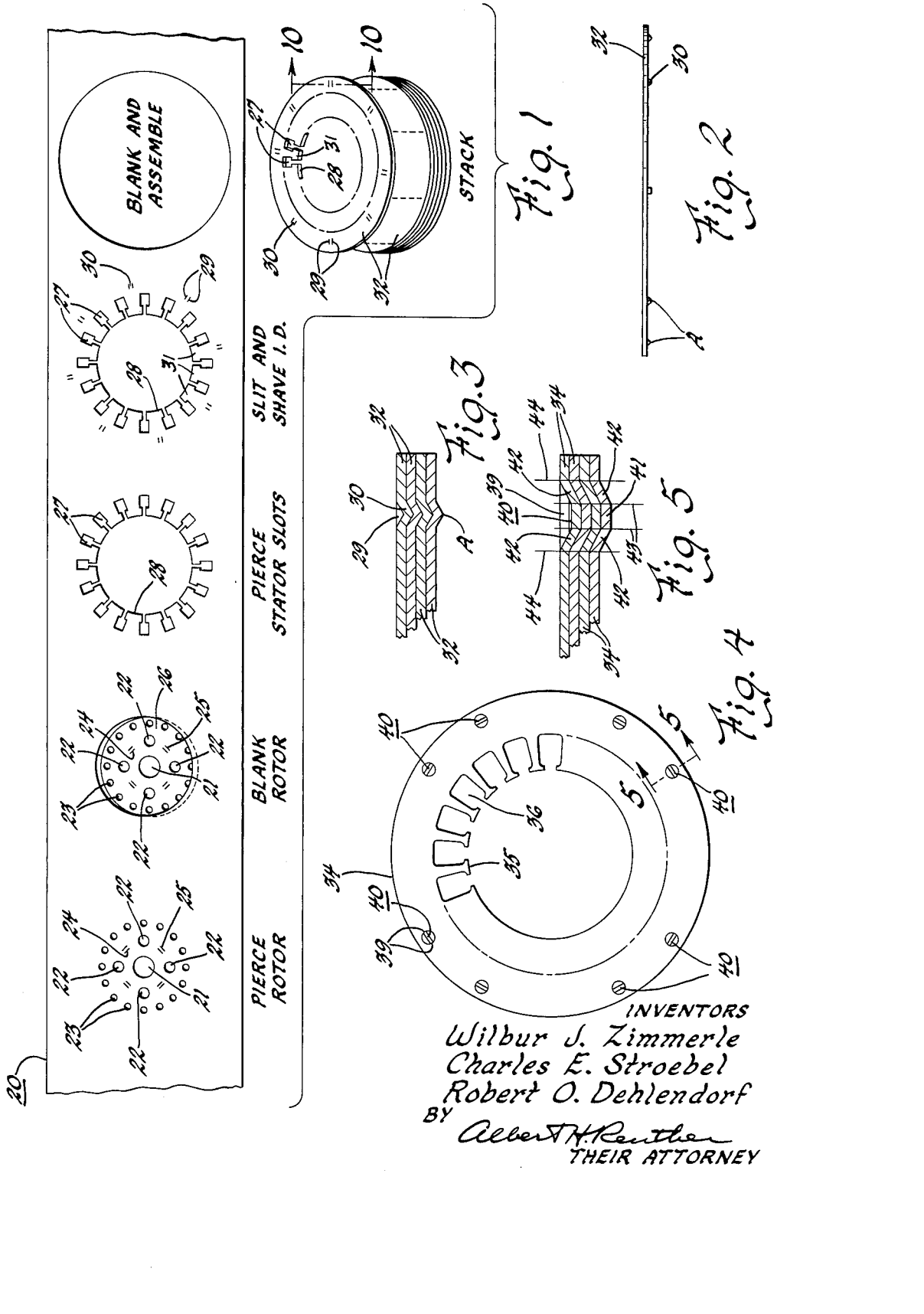

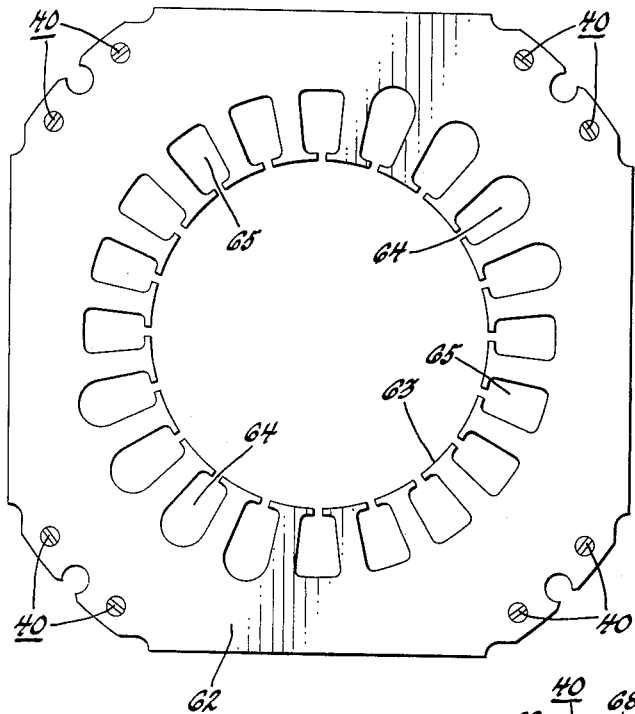
Fig. 13
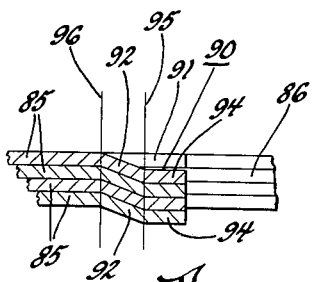
Fig. 17
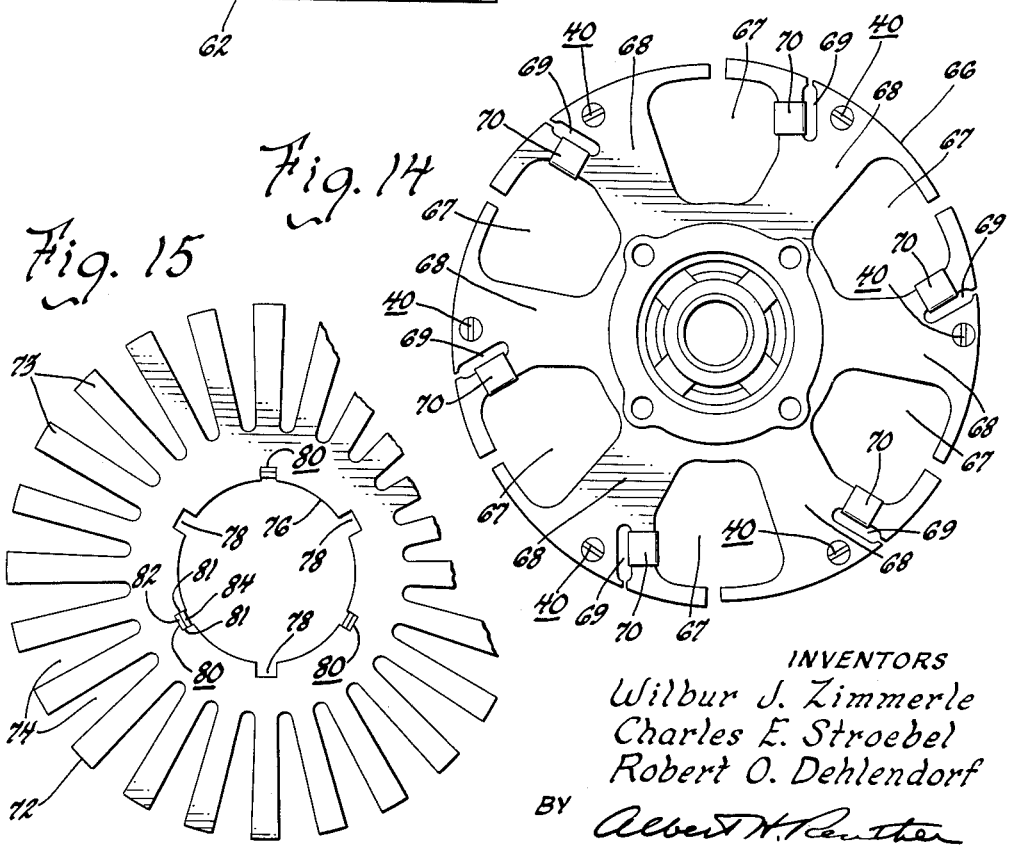
Fig. 14
Fig. 15
INVENTORS
Wilbur J. Zimmerle
Charles E. Stroebel
Robert O. Dehlendorf
BY Albert H. Reuther
THEIR ATTORNEY

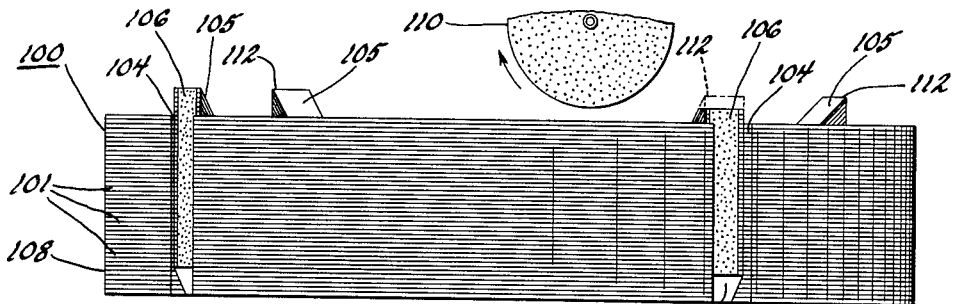
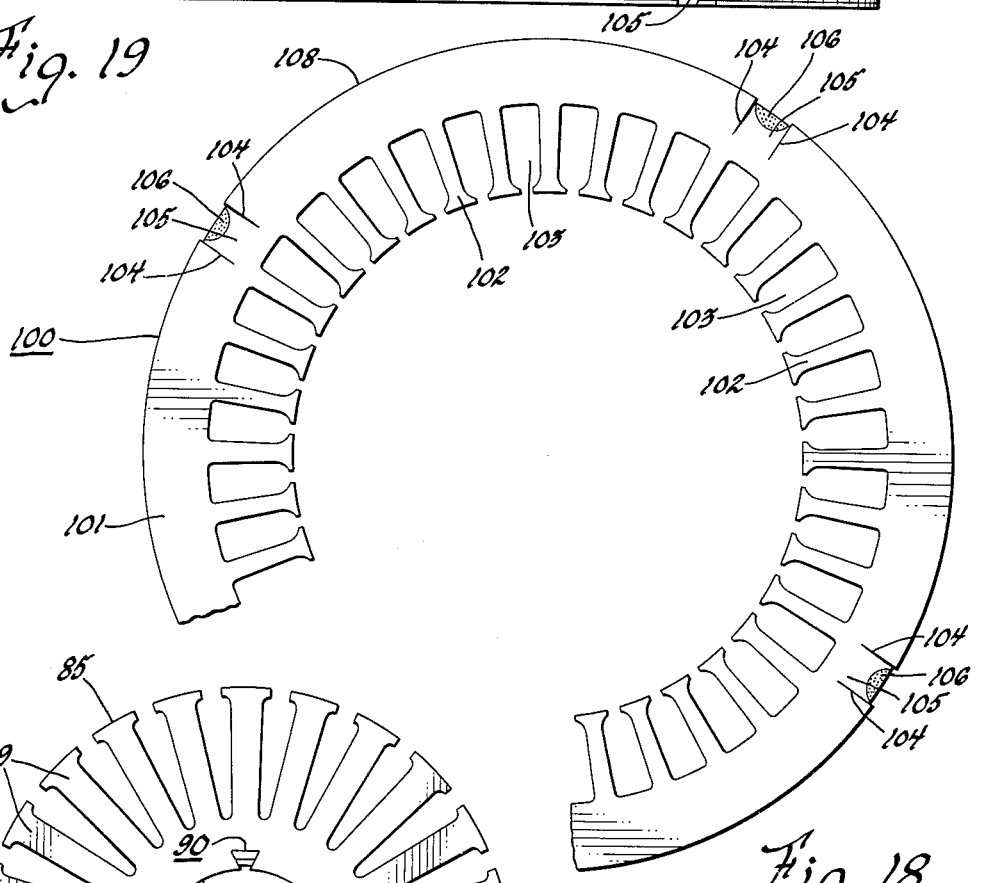
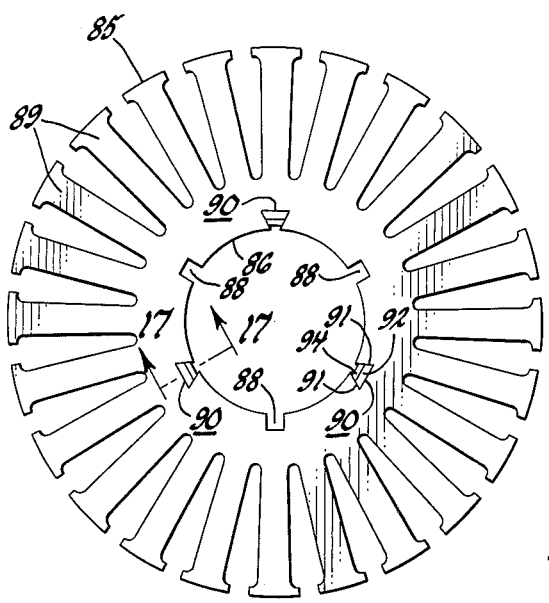

United States Patent Office 3,202,851
Patented Aug. 24, 1965

3,202,851
METHOD AND MEANS FOR ALIGNING AND FASTENING LAMINATIONS OF DYNAMOELECTRIC MACHINE
Wilbur J. Zimmerle, Charles E. Stroebel, and Robert O. Dehlendorf, Dayton, Ohio, assignors to General Motors Corporation, Detroit, Mich., a corporation of Delaware
Filed July 19, 1961, Ser. No. 125,190
1 Claim. (Cl. 310—259)

This invention relates to dynamoelectric machines and, particularly, to a method and means for aligning and fastening laminations thereof relative to each other.

An object of this invention is to provide a new and improved method and means for aligning and fastening laminations relative to each other.

Another object of this invention is to provide a lamination assembly adapted to cause less core loss when used for a dynamoelectric machine, to give improved electrical performance, to be free of rivets so as to save material and time during assembly and also so as to avoid interference with tying of string or the like for support of ends of wire coils placed relative to slots in laminations forming the assembly.

Another object of this invention is to provide a stack of laminations interlocked and aligned relative to each other by means of slit extruded portions adapted to be wedged into tight engagement relative to an opening of an adjacent lamination from which a comparable extruded portion has been formed.

Another object of this invention is to provide a cros-keyed joining of adjacent laminations for a dynamoelectric machine prior to heat treating thereof, though properly aligned to resist distortion and free of rivets. This is achieved by using a lamination metal exclusively subject to extrusion in part as punched to have opposite edges press-fitted for binding along the periphery of an opening left by a similar punching of an adjacent lamination. Thus repeatedly a flattened end of the extrusion can interlock tightly while there is limited stretching of metal of the extrusion adjacent thereto.

A further object of this invention is to provide a stator lamination assembly free of rivets and having a dovetail interfit with generally keystone-shaped slitting to hold laminations against lateral shifting and in proper alignment. Such dovetail interfit provides stability substantially free of distortion as laminations are secured firmly together by flattened platform-like free ends progressively wedged to grip an adjacent lamination opening periphery. Advantages include savings in time and material as well as improvement of electrical performance.

Another object of this invention is to provide a stator lamination assembly free of rivets and having substantially parallel slitting of lamination metal bent and joined in interlock for alignment. Such interlock is provided subject to peripheral wedge-like binding, welding and squaring off along the ends for mounting transverse to the axis of a lamination stack-up.

Further objects and advantages of the present invention will be apparent from the following description, reference being had to the accompanying drawings wherein preferred embodiments of the present invention are clearly shown.

In the drawings:

FIGURE 1 is a composite view representing progressive die metal strip stampings for formation of dynamoelectric machine rotor and stator components in accordance with the present invention.

FIGURE 2 is an end view of a stator lamination component made progressively as shown by FIGURE 1.

FIGURE 3 is an enlarged fragmentary sectional view of an interlock portion of the lamination component of FIGURE 2.

FIGURE 4 is a plan view of another stator lamination component progressively produced in accordance with the present invention.

FIGURE 5 is an enlarged fragmentary view of an interlock portion of the lamination component sectioned along line 5—5 in FIGURE 4.

FIGURE 6 is a plan view of a die means for use in accordance with the present invention.

FIGURE 7 is a partially-sectioned side view of the die means of FIGURE 6.

FIGURES 8 and 9 are end and side views, respectively, of a die punch for use in the die means of FIGURES 6 and 7.

FIGURE 10 is a fragmentary sectioned view taken along line 10—10 in FIGURE 1.

FIGURE 11 is a fragmentary sectioned view to show interlock of stator lamination components of FIGURE 1 and using a flattening fixture punch to fit die means of FIGURES 6 and 7.

FIGURE 12 is a cross-sectional view taken along line 12—12 in FIGURE 11.

FIGURES 13 and 14 illustrate further stator lamination components in accordance with the present invention having interlock portions as shown by FIGURE 5.

FIGURES 15 and 16 illustrate further stator lamination components in accordance with the present invention.

FIGURE 17 is a fragmentary cross-sectional view taken along line 17—17 in FIGURE 16.

FIGURE 18 is a plan view of another stator lamination component with an aligning portion in accordance with the present invention.

FIGURE 19 is an end view of the stator lamination component of FIGURE 18.

Savings in materials and expense during manufacture of dynamo-electric machine stator and rotor components are continually being sought together with improvement in procedure as well as electrical performance. Elimination of rivets on lamination assemblies obviates catching of conductor wire during formation of end turns. Also mechanized fingers and the like can pull conductor wire relatively tightly around end turn bends where no rivets project or protrude laterally from a lamination assembly stack-up. An example of a stator coil winding machine useful for fitting conductor wire into stator lamination slots can be found in a Patent 2,988,291, Greene et al., issued June 13, 1961. Furthermore, elimination of rivets on sides of lamination assembly stack-ups can avoid interference with tying of string or binding cord by means of a needle mechanism, an illustration of which is provided in a Patent 2,580,871, Wirtz, also belonging to the assignee of the present invention. The needle of this mechanism can get closer to sides of the lamination assembly without danger of interference and breaking off due to striking a protruding rivet, through bolt and the like.

As to improvement of electrical performance, it is noted that sheet metal laminations for dynamoelectric machine cores must be fastened together prior to annealing in a suitable furnace since core losses up to 28 watts are encountered if the laminations are heat treated in a furnace first and later assembled. Generally, only a maximum core loss of between 11 and 13 watts is acceptable and perferably core loss is to be held below this amount. By use of riveted laminations a core loss generally in the area of 10.2 watts is encountered. Also, if lamination stack-ups are subjected to severe blows or banging referred to as "cracking" of laminations to avoid sticking together, a core loss of only substantially 9.8 watts is generally encountered. It has been found that core loss can be reduced substantially to approximately 8 watts if assembled in accordance with the present invention. This involves provision of interlock means integral with the laminations and free of riveting as assembled prior to placement in a furnace for annealing. The annealing can be in accordance with a disclosure of copending application Serial Number 68,605, Sweeney et al., filed November 14, 1960, now Patent 3,095,333, issued June 25, 1963, and belonging to the assignee of the present invention. Using the features of the present invention it is possible to reduce by 6 watts the full load core losses acceptable as a limit for dynamoelectric machine operation.

FIGURE 1 illustrates a continuous sheet metal strip generally indicated by numeral 20 and adapted to be fed through successive locations or stations of a progressive die means. At least two or more locations or stations of such a progressive die operation and method of assembly can be used for formation of rotor component laminations. These are stamped centrally at predetermined intervals along the metal strip means 20 so as to utilize as much of the metal as possible and to avoid waste of a central cutout for stator component laminations. There is a first location or station identified in FIGURE 1 by a reference label "pierce rotor" designating intial operation. Here suitable dies stamp and cut a central hole 21 for receiving a rotor shaft and the like. Also such dies here form ventilating apertures or holes 22 and rotor winding slots 23. Arcuately in alignment with the ventilating apertures or holes 22 as shown in FIGURE 1, interlock bumps or notches can be formed between radially inner slits 24 and radially outer slits 25. These radially separated slits 24–25 are substantially parallel to each other and can be instrumental for interlocking rotor laminations so as to have the winding slots 23 extend longitudinally and axially through the rotor formed by a stack of such laminations. Also such slits permit formation of a dynamo-electric machine rotor component in which individual laminations are angularly displaced as fastened to each other so as to provide a skew in the interlock fastening of rotor laminations such as indicated by numeral 26. Such lamination formation per se occurs in a second location or station provided with a reference label "blank rotor" to represent cutting out or blanking of rotor laminations to a predetermined peripheral size and dropping thereof from the sheet metal strip means 20. Reference can be made to a copending application S.N. 125,191; Zimmerle filed concurrently herewith, now Patent 3,110,831, Zimmerle, issued November 12, 1963, and belonging to the assignee of the present invention as to rotor lamination fastening assembly and procedure involving progressive die means. This patent shows progressive die means of which a portion in one station can be subjected to predetermined and limited arcuate rotation so as to achieve skew of laminations concurrently with assembly and fastening of rotor laminations to each other directly in die means.

After formation of the rotor laminations from the metal strip means 20 there is a location or station provided with a reference label "pierce stator slots" where a plurality of radially outwardly extending slots 27 are cut or pierced into the metal strip means 20. These slots 27 extend outwardly from a central opening or bore 28 left by removal of metal for rotor lamination assembly. Also it is to be noted that the inner periphery of this bore 28 can be shaved and trim cut by suitable tooling and removal of metal from the internal diameter of sheet metal means to become a stator lamination. In the next of fourth location or station illustrated progressively in FIGURE 1, the metal strip means 20 can be provided with pairs of radially outwardly extending cuts or slits 29 having an interlock bridge portion 30 therebetween formed by a die means described in further detail in a subsequent paragraph. It is to be noted that the cuts or slits 29 are located radially beyond and outside the slots 27 and generally the slits or cuts 29 are in alignment with solid metal of teeth 31 between the slots 27 rather than in alignment with the slots 27.

Finally, there is a location or station where a stator lamination 32 is cut or blanked for assembly into a stator lamination component. As represented in FIGURE 1, a stack of such laminations 32 having a predetermined width or depth is formed collectively by deformation of the interlock bridge portions 30 wedged into an immediately adjoining lamination by a fixture die means in accordance with the present invention. In FIGURE 1 reference labels "blank and assemble" as well as "stack" are applied to designate locations and stations involved in this final stator lamination assembly in accordance with the present invention. A preceding fourth station is identified by "slit and shave I.D." representing cutting of the internal diameter to a predetermined dimension as well as formation of the radially extending slits 29 prior to blanking of a stator lamination 32 from the metal strip means 20.

FIGURE 2 illustrates one of the stator laminations 32 in an end view and FIGURE 3 provides an enlarged section of the interlock bridge portion 30 having a substantially V-shape with an apex A thereof adapted to be wedged into press-fitted peripheral engagement along edges of the slits or cuts 29 so as to provide mechanical joining of adjacent stator laminations 32 as outlined in FIGURE 3.

In FIGURE 4 there is a showing of a stator lamination 34 generally annular in shape provided with a central opening or bore 35 from which slots 36 extend radially outwardly. Metal for the stator lamination 34 can come from a strip means such as 20 shown in FIGURE 1. In predetermined lamination locations, a particular angular die punch means to be described further can form a pair of substantially annular though radially extending cuts or slits 39 between which there is an arcuate interlock bridge portion generally indicated by numeral 40. Each interlock bridge portion 40 includes a flattened portion 41 joined integrally at one end of a stretched metal segment 42 which is located angularly offset from the metal of lamination 34. Each segment 42 joined at one end to the flattened segment portion 41 of one lamination assures offset of bridge portion centrally to a position substantially parallel to though coplanar with an adjoining lamination also having identical interlock portions 40 and fitted adjacent thereto. The stretched segments 42 of each of these laminations can have a width reduced in size due to stretching of metal therein and thus, not binding or wedging against peripheral edges defined and left by the slits or cuts 39. Reduced thickness of these stretched segments 42 can be seen in the fragmentary cross-sectional view of FIGURE 5 wherein there is also provided an illustration of joined interlock portions 40 of adjacent laminations 34 in accordance with the present invention. The filattened segment or portion 41 of each lamination 34 is offset laterally a distance coinciding substantially only with thickness of an adjoining lamination as illustrated. Thus, specific joining with lamination to lamination interference fit and alignment occurs such that corners of the stretched segments 42 provide a substantially parallelogram configuration with substantially symmetrical positioning of the corners to coincide with pairs of lines 43 and 44 as indicated in FIGURE 5.

FIGURE 6 illustrates a pair of complementary die members 45 and 46 further shown in elevation and partially sectioned in FIGURE 7. The die member 45 has a central upwardly extending extension E for mounting thereof on a suitable die mechanism having progressive locations or stations and in one of these locations or stations the member 45 is adapted to be in alignment with the member 46. The bottom member 46 has a plurality of passages or openings 47 in alignment with and adapted to have the sheet metal means 20 pass thereover subject to engagement and stamping by a die punch means generally indicated by numeral 48 and shown in further detail in views of FIGURES 8 and 9. Each of the die punch means 48 has a rod-like or angular cross-section and terminates in a pair of semi-arcuate downwardly extending edges 49 located between a crescent-shaped intermediate recess 50 located between slanted edges 51 as shown in views of FIGURES 8 and 9. Each die punch means 48 has a flattened side 52 engageable by a set screw means 53 having an end transverse slot so as to permit turning of the set screws 53 for radially inward and outward positioning relative to threaded passages in the upper member 45. Further threaded set screw members 54 are adapted to be positioned and locked by nuts 55 as axial backing for the die punch means 48 so as to permit accurate adjustment and poistioning of the die punch means 48 relative to the upper die member 45. The die punch means 48 effects cutting and slitting of metal for stator laminations such as 32 and 34. In the procedure of blanking and assembling a stack of laminations, the blanked or cut lamination per se immediately prior to assembly to an adjoining lamination can have an interlock bridge portion 40 including a stretched segment 42 initially deformed by the slanted edges 51. Also an arcuate portion therebetween illustrated in an upper lamination shown in the cross-sectional view of FIGURE 10 results. Such arcuate portion integral with the stretched segment 42 on each side thereof can follow the contour of recess 50 between the sharp edges 49 of the die punch means 48 illustrated in FIGURES 8 and 9. The view of FIGURE 10 represents the upper lamination and a stack of laminations previously joined to each other immediately adjacent thereto and in alignment therewith. At the "blank" and "assemble" station a relatively flat-ended fixture punch means generally indicated by numeral 56 in views of FIGURES 11 and 12 can effect a flattening and wedging of the flat segment or portion 41 into interlock with edges defined by slits such as 39 formed by the edges 49 of the die punch means 48. The flat fixture punch means includes further slanted surface portions 57 on opposite sides of a transverse blunt and flat end 58 which engages the transverse flat portion 41 of each interlock means 40 so as to shift the flat segment 41 and to stretch the segments 42 integral therewith into further thin cross-section. The cross-section of the flat segment 41 remains greater than that of the angular segments 42 integral therewith and stretched therefrom. It is to be noted that angular relationship between the blunt end 58 and the sides 57 adjacent thereto on the flat fixture punch means 56 can be in a range between 27° and 35° from the horizontal and thus the same angular relationship exists between the stretched segments 42 and flattened segment or portion 41 of the interlock means 40. It is to be noted that one end lamination of each stator assembly can have a hole or an aperture punched therein corresponding substantially to the interlock means 40 in diameter but having no stretched segment 42 or flattened portion 41 therein. Thus the bottom lamination of a stack-up provided with such interlock means can have a wedge fit to the peripheral edges of such a hole 59 represented in an end lamination 60 outlined in FIGURE 12. The die mechanism can be provided with a station where at predetermined intervals the lamination is formed to have such a hole 59 in place of the interlock means. Accordingly a predetermined number of laminations provided with such interlock means can then be stacked into an assembly which will not adhere or stick to any previously formed stator lamination assemblies. Provision of such a lamination 60 having only a hole 59 can avoid sticking of stator lamination assemblies to each other during storage or subsequent use on dynamoelectric machines. Multiple stator lamination assemblies can thus be placed on top of each other during storage providing a further advantage in accordance with the present invention.

It is to be noted that the diameter of the flat fixture punch means 56 can be slightly smaller than that of the die punch means 48. A two and one-half thousandths of an inch difference in such diameter can facilitate assembly and stacking of the lamination fastenings in alignment vertically in accordance with the present invention in a last location or station of the progressive die means. Use of at least four or more interlock portions 40 as crosskeys can prevent lateral shifting and misalignment. It is to be noted that a wedging function occurs between adjacent laminations which are in no way "cold welded" to each other. Each interlock portion provides a bump for line up as well as for wedging or sticking of adjacent laminations to each other. There is a metal to metal interlock providing a savings in time as well as materials. Flattened bottom portions assure provision of a surface to take hold of along sides that provide the gripping action. It is to be noted that the holes 59 in an end lamination 60 can be formed by intermittent cam-controlled operation of the die punch means 48 in the station immediately preceeding the assembly and stacking operations such that the die punch means 48 can be caused to pass all the way through the sheet metal of the strip means 20 so as to make a hole that permits locking of the last or first lamination to a previously punched deformation of interlock means 40 in accordance with the present invention. This prevents sticking of one stack to another stack of stator lamination assemblies. The recess 50 as illustrated in FIGURES 8 and 9 has been dimensionally exaggerated for purposes of illustration and it is to be noted that this recess can be relatively slight in a range between five thousandths and one hundredth of an inch in depth. The end laminations 60 can be of the same thickness as the sheet metal of strip means 20 or the end laminations can be made to have greater thickness with coined edges defining teeth between stator slots so as to have no sharp edges against which wire conductors fitted to the slots can be damaged during winding. It is to be noted that by use of the interlock means 40 in accordance with the present invention it is possible to have a two inch stack-up of stator laminations weigh only ninety-three ounces where previously ninety-five ounces of weight would be obtained. Thus, if ten thousand stator lamination assemblies are made there is a saving of twenty thousand ounces of metal though substantially the same or less core loss is encountered. The interlock means serve to key laminations together adjacent to each other so as to resist distortions during subsequent heat treating and each lamination is crosskeyed into the next lamination absolutely insuring alignment and stability. For electrical performance purposes the interlock portions 40 on the stator laminations should be located outwardly from the slots therein and it is to be noted that for certain sizes of stator laminations there can be four, eight, sixteen and possibly thirty-two such interlock portions 40 provided. The interlock portions can be used with or without progressive die stamping procedure but when using a progressive die mechanism, the last normal blanking out position could be set so that the lamination is not cut completely loose but is retained by a few small connecting points to the final cutoff and stacking position where the fixture die means would be flat bunt ends to effect assembly of the laminations to each other in a stack subject to breaking and severing of the few small connecting points under pressure supplied by the top punch member in movement toward the lower pressure pad or member. It is to be noted that the pressure pad or lower member of the die mechanism is retracted for the equivalent of substantially one lamination in thickness with each stroke of the press and the number of retractions of this pressure pad or lower member can determine the stack height. A plurality of pressure pads or lower members could be provided to be indexed into alignment with the upper die member such that a stator, when completed, can be indexed and swung out from under the press while a second or further pressure pad or lower member and retracting mechanism therefor can be swung in to take its place for the next stator lamination assembly.

It is to be noted that as set forth more clearly in the copending application S.N. 125,191, Zimmerle, now Patent 3,110,831, issued November 12, 1963, the interlock portions such as 40 can be used also for rotor lamination assembly though in any event, the interlock portions on rotor assemblies should be as close to the center hole as possible for electrical performance purposes. If the rotor laminations are to be provided with slots in skewed relation to each other, the angle immediately adjacent to the center will be only one or two degrees and the slight angle will impart skew to the slots adjacent to an outer periphery of the rotor lamination assembly. The slits are radially separated from each other for the rotor lamination assembly so that skew can be provided by having the bridge portions intermediate slits dislocatable angularly from each other though radially the slits remain in generally arcuate and concentric paths. It is possible for both rotor and stator lamination assemblies to be formed simultaneously off of a unitary punch press machine with all laminations in perfect alignment to each other without need for separate weighing of laminations and danger of sticking of finished lamination assemblies to each other. Outer and inner diameters can be held practically to lamination sides and there is greater stability in each lamination assembly. All burrs due to stamping of sheet metal will extend in the same direction as a result of progressive die formation of the lamination assemblies and all laminations are lined up in press position for immediate assembly with no danger of distortion of laminations due to handling between differing operations in performing a job of assembling laminations into either stator or rotor components for a dynamoelectric machine. Use of a skew can be avoided by following the teaching of the copending application S.N. 125,191, Zimmerle, now Patent 3,110,831, issued November 12, 1963, and savings in labor and materials can be realized as well as savings in additional machinery such as previously required for lineup of stator and rotor components.

FIGURE 13 illustrates a substantially square or rectangular stator lamination 62 having a central bore or opening 63 from which deep slots 64 as well as shallow slots 65 extend radially outwardly. In each corner of the square lamination 62 there can be provided a fastening interlock means generally indicated by numeral 40 in accordance with the present invention and alignment and interlock of two of such fastenings in each corner can be substantially as illustrated in FIGURE 5.

FIGURE 14 illustrates another stator assembly for a shaded pole dynamoelectric machine having each lamination 66 provided with radially inwardly extending slots 67 as well as teeth 68 in between the slots. Each of the teeth 68 is provided with a recess 69 to permit fitting of a shading coil or winding 70 thereto. Interlock fastening means generally indicated by numeral 40 in accordance with the present invention can be provided to be located substantially adjacent to an outer edge and centrally along each of the teeth 68 of the stator for an inside-out dynamoelectric machine. Suitable stator windings (not shown) can be fitted to the slots 67 in a conventional manner. Use of the interlock fastening means 40 provides proper alignment and interlock of the laminations to each other in addition to the other advantages previously noted.

FIGURE 15 illustrates another stator lamination indicated by numeral 72 having radially outwardly extending teeth 73 defining slots 74 extending radially inwardly therebetween. This stator lamination 72 of FIGURE 15 can also be used for an inside-out dynamoelectric machine and it is to be noted that suitable conductors or windings can be fitted to the slots 74. The lamination 72 has a central opening or bore 76 with three equally-spaced slots 78 extending radially outwardly therefrom to provide a key or spline interlock relative to a pair of heavier or thicker end laminations subject to filling with die cast metal hub material having a central bore for journalling a rotor shaft similar to that shown by Patent 2,990,112 belonging to the assignee of the present invention. Further interlock fastening means generally indicated by numeral 80 similar to those disclosed for rotor means in a copending application S.N. 125,191, Zimmerle, now Patent 3,110,831, issued November 12, 1963, mentioned earlier can be spaced equally from each other in locations intermediate slots 78 and must be formed immediately adjacent to an opening or hole such as 76 having a pair of radially outwardly extending slits 81 between which there is provided an elbow-shaped portion including a stretched segment 82 as well as a flattened end portion 84 integral therewith. The flattened end portion 84 is adapted to be offset though parallel to the lamination from which it was struck and coplanar substantially with an adjoining lamination.

FIGURE 16 illustrates a lamination 85 for an inside-out dynamoelectric machine stator component and provided with a central bore or opening 86 as well as key slots 88 and teeth 89 defining winding slots therebetween extending radially therewith. The lamination 85 is provided with interlock means generally indicated by numeral 90 including a pair of radially outwardly diverging slits 91 providing a dovetail-like configuration therebetween including an angularly disposed stretched segment 92 as well as a flattened end 94 having a keystone shape substantially parallel to the metal of lamination 85 from which it was struck. Each flattened end is displaced to be coplanar and in locking wedge fit with an adjoining lamination as illustrated by the cross-sectional view of FIGURE 17. Thickness of the stretched portions 82 and 92 is reduced while the flattened end portions 84 and 94 are swaged laterally outwardly to wedge edges thereof into press-fit and interlocking engagement with an immediately adjacent lamination. It is to be noted that a vertical pair of lines 95 and 96 represent the parallelogram-like configuration of the stretched segments 92 as can be best seen in FIGURE 17. This is similar to the parallelogram-like configuration of the stretched segments illustrated in the cross-sectional view of FIGURE 5. The lines 95 and 96 represent the accurate vertical alignment of the interlock means 90 similar to the accurate alignment of interlock means 40 described earlier. It is to be understood that even when square laminations are formed by a progressive die operation it is possible to form an annular rotor lamination out of the center of the square laminations. In all instances only the metal material between the teeth where slots are provided need be discarded as scrap. The flattened end portions 84 and 94 provide a platform-like interfit of laminations and the dovetail-type interlock means 90 permits opposite edges of the metal between the slits to be relieved except where interlock is achieved by flattening and swaging of the platform or flattened end portion to wedge along edges thereof into tight fit and interlock with an adjacent lamination. It is to be understood that the platform or flattened end portion is drawn down so as to stretch the metal of the stretched segments angularly though integrally from the lamination metal. The inside-out stator lamination assemblies using laminations illustrated by FIGURES 14, 15 and 16 can be provided with end laminations in accordance with a disclosure of copending application Serial Number 84,189, Koehly et al., filed January 23, 1961, now Patent 3,097,320, issued July 9, 1963, and belonging to the assignee of the present invention. Fluidized-bed insulation of the stator component can also be provided as noted in this copending application.

FIGURES 18 and 19 illustrate further stator lamination assembly generally indicated by numeral 100 and including a plurality of individual laminations 101 each having radially inwardly extending teeth 102 defining slots 103 radially therebetween. Along an outer peripheral edge of each of the laminations 101 there can be a pair of radially inwardly extending and parallel cuts or slits 104 between which an interlock and alignment portion 105 is bent angularly to one side of each of the laminations 101. Adjacent to outer ends of these angular portions 105 there can be axially or longitudinally extending welds 106 visible both in FIGURES 18 and 19 and these welds will be recessed from an outer periphery 108 of the stator lamination assembly because of the bending of the tangs or tabs for alignment. It is to be noted that a suitable grinding means or tool 110 can be used to remove triangular ends 112 of the angular fastening portions 105 for mounting of a stator assembly in a plane transverse to the axis of the stator lamination assembly having a bore or opening centrally therein to receive a rotor means suitably journalled therewith. The welds 106 can extend for the entire length of the bent-over portions 105 of the metal of the laminations and no rivets are required. There is both fastening as well as alignment as a result of the interlock means which if machined or ground off as indicated in FIGURE 19 provide further a mounting pad for a stator lamination assembly which can be subjected to shipping for subsequent installation of a stator assembly on a hermetic-motor compressor housing on refrigeration equipment such as air conditioners, refrigerators and the like. The grinding off of the triangular corners 112 as indicated in FIGURE 19 can provide air gap control and squareness relative to the compressor housing where the stator assembly can be mounted to have access thereof extending vertically. The incline of the angularly bent portions 105 provide alignment as well as interlock and mounting pads along one side of the stator assembly 100 while during transportation of stator assemblies per se there is less danger of shear of laminations from out of assembled relationship. Such shear is avoided in view of the interlock of the angularly bent segments or portions 105. The welds 106 are confined in a trough-like path as can be seen in the views of FIGURES 18 and 19 and thus spattering of weld material is minimized relative to an outer periphery of the stator lamination assembly 100.

It is to be noted that the ground off corners or pads of FIGURE 19 as well as laterally projecting interlock means could be mated into corresponding cutouts or recesses of an end frame of cast metal and the like to assure proper positioning for holding stator means fixed in a dynamoelectric machine in a predetermined location. Preferably on rotor lamination asseemblies for balanced and quiet operation an even number of interlock means can be provided. In both stator and rotor assemblies, the interlock means in accordance with the present invention serve to hold the laminations once assembled to each other under tension force of interference fit rather than under sustained compression due to compacting of all laminations under force of tightened through bolts or rivets such as on a stator assembly. Use of the interlock means thus assures limited spacing or predetermined gaps between adjacent laminations rather than surface to surface sticking thereof to each other as also avoided by the particular anneal treatment noted earlier to reduce core loss by added processing regardless of fastening procedure to be used. Examples of core loss cited previously relate to a particular dynamoelectric machine and can thus vary according to features thereof. However, variation of range of high and low wattage values representing stator core losses can be narrowed by use of interlock means in accordance with the present invention. Generally it has been found that with all properties except the fastening being equal, the average of core loss wattage for riveted stator assemblies has a wider range of high and low watts whereas stator assemblies using the subject interlock means have a narrow range of high and low wattage values representing core losses therein.

Fixtures for mounting die means to form the interlocks of the present invention can be varied in structure differing from that shown in FIGURES 6 and 7 for illustration purposes only. Die means to form interlocks can be adapted for use in a progressive die arrangement as well as in a tandem set up in which a stator die per se will not be used to assemble the tsator. In some instances it is possible to cut the inner and outer diameters as well as the interlock slits all at the same time in the same station with assembly possible in a separate operation on a hydraulic or fluid press. Use of a pressure pad in the die mechanism is optional.

While the embodiments of the invention herein disclosed constitute preferred forms, it is to be understood that other forms might be adopted.

What is claimed is as follows:

In a stator lamination assembly for a dynamoelectric machine provided with a central bore and outwardly extending teeth, interlocking means for securing adjacent laminations together in interlocking relationship progressively throughout the length of the stator assembly, comprising: displaced dovetail lamination segments and complementary lamination openings for receiving said dovetail segments; said displaced dovetail segments being formed in each lamination by a pair of diverging slits radially extending from the peripheral edge of the lamination bore opening and being located so that each dovetail segment is radially aligned with one of the stator teeth and axially aligned with the complementary lamination opening of an adjacent lamination, the opposing edges of said slits defining said complementary lamination opening; said displaced dovetail segments including an angularly stretched portion terminating in a flat portion being offset substantially the thickness of an adjacent lamination, said angularly stretched portion extending through the complementary opening of an adjacent lamination free of engagement with the edges of said opening and said flat portion being displaced so as to be aligned with said complementary opening and substantially coplanar therewith and being secured to said adjacent lamination by a wedging engagement with said opposing edges of the adjacent lamination opening, whereby each lamination is secured to an adjacent lamination through said displaced dovetail lamination segment, and the stator lamination assembly is integrally secured by the interlocking of one lamination with an adjacent lamination.

References Cited by the Examiner

UNITED STATES PATENTS 2,975,312 3/61 Ploran _____ 310—217
3,012,162 12/61 Rediger _____ 310—259

FOREIGN PATENTS 603,175 8/60 Canada.
917,626 9/54 Germany.

MILTON O. HIRSHFIELD, *Primary Examiner.*